United States Patent [19]

Acker et al.

[11] 4,402,181
[45] Sep. 6, 1983

[54] HYDRAULIC DRIVE SYSTEM FOR A VEHICLE

[75] Inventors: Alvin W. Acker; Clyde R. Headrick, both of Topeka, Kans.

[73] Assignee: Allis-Chalmers Corporation, Milwaukee, Wis.

[21] Appl. No.: 214,639

[22] Filed: Dec. 10, 1980

[51] Int. Cl.³ ............................................. F16D 31/02
[52] U.S. Cl. ...................................... 60/427; 60/484; 60/486; 60/443; 180/307; 180/308
[58] Field of Search ................ 60/427, 484, 486, 443, 60/444; 180/307, 308

[56] References Cited
U.S. PATENT DOCUMENTS

| | | |
|---|---|---|
| 3,583,512 | 6/1971 | Praddaude ...................... 60/427 X |
| 3,750,406 | 8/1973 | Verlinde et al. .................. 60/443 X |
| 3,952,511 | 4/1976 | Turner et al. ......................... 60/430 |
| 3,981,374 | 9/1976 | Johns, Jr. ....................... 180/307 X |
| 4,015,679 | 4/1977 | Klitz ............................. 180/308 X |

*Primary Examiner*—Arnold Rosenthal
*Attorney, Agent, or Firm*—Arthur L. Nelson

[57] ABSTRACT

A hydrostatic drive system having a closed loop front wheel drive circuit and a closed loop rear wheel drive circuit. A variable displacement pump in each of the circuits is cammed to vary the displacement delivered to dual displacement wheel motors to provide two speed ranges for the drive system. A servosystem uses hydraulic fluid to cam the displacement of the variable displacement pump and a hydraulic control to selectively engage each of the drive ranges.

10 Claims, 3 Drawing Figures

HYDRAULIC DRIVE SYSTEM FOR A VEHICLE

This invention relates to a hydrostatic drive system for a vehicle and more particularly to a drive system having a closed loop front wheel drive circuit and a closed loop rear wheel drive circuit. Each of the circuits include a variable displacement pump and two speed dual displacement wheel motors to provide two speed ranges and infinitely variable torque and speed hydraulically controlled in each of the circuits.

Vehicle drive systems conventionally have a plurality of speed ranges with an internal combustion engine to drive the vehicle. Conventionally, a clutch selectively engages one of the speed ratios of a gear drive system. Hydraulic drive has been ued in some vehicles and has the advantage of providing infinite speed over any speed range. The infinite speed ratio is generally controlled by a variable displacement pump in which the stroke of the pump is varied and the drive means is generally an internal combustion engine to continuously drive the hydrostatic pump. In order to provide two speed ranges in a dual closed loop system, the hydraulic fluid may be circulated from the tandem pumps to one of the circuits to increase the speed of the drive, and circulated through both of the circuits to reduce the drive speed and increase the torque. A system of this type is illustrated in the Turner et al. patent, U.S. Pat. No. 3,952,511. A dual closed loop system is used and an engine is used to drive tandem pumps to provide the hydrostatic drive system. Crossover flow is provided between the two systems to control the pressure and flow in the systems and uniform drive on all four wheels. The speed and torque of the drive system is controlled by a variable displacement pump which is manually controlled and is reversible to provide forward and rearward drive on the wheel motors. Manual controls are not as sensitive as hydraulic controls and, accordingly, the applicants have provided an improved control system in which the variation of stroke is controlled through a hydraulic servocontrol valve. Similarly, the hydraulic drive motors are provided with two speed drive through the use of dual displacement for the wheel motors which can be selectively controlled through a hydraulic control valve. The hydraulic controls on the pumps and the motors provide a sensitive easy to control drive system. The two speed ranges through dual displacement of the wheel motors provides two speed ranges with infinite variation in torque and in speed provided through variable displacement of each of the two pumps in the two closed loop circuits without sacrificing traction. Accordingly, the drive system provides a four wheel drive with two speed ranges and infinite control of speed and torque through a hydraulic control system.

It is an object of this invention to provide a four wheel hydrostatic drive system with hydraulic controls for a vehicle.

It is another object of this invention to provide a hydrostatic drive system with infinitely variable pump displacement and at least two motor speed ranges by selective variation in the displacement of each of the wheel motors.

It is a further object of this invention to provide a hydrostatic servocontrol valve on the variable displacement pumps and a selective valve having hydraulic control on two speed motors to provide two speed ranges in a four wheel drive system and infinite variations in speed and torque of the system.

The objects of this invention are accomplished by a dual hydrostatic system with a hydraulic servocontrol valve to hydraulically cam the controls for the swash plate on a variable displacement pump. The wheel motors are provided with a dual displacement means and a selective valve which hydraulically shifts the motor into each of the two ranges of displacement to provide two speed ranges. Flow control valves are used on each of the wheel supply lines to limit the flow to any one wheel to assure that the wheel drive system will not spin out on one wheel while the other is standing still.

Referring to the drawings, the preferred embodiment of this invention is illustrated.

Figure 1:
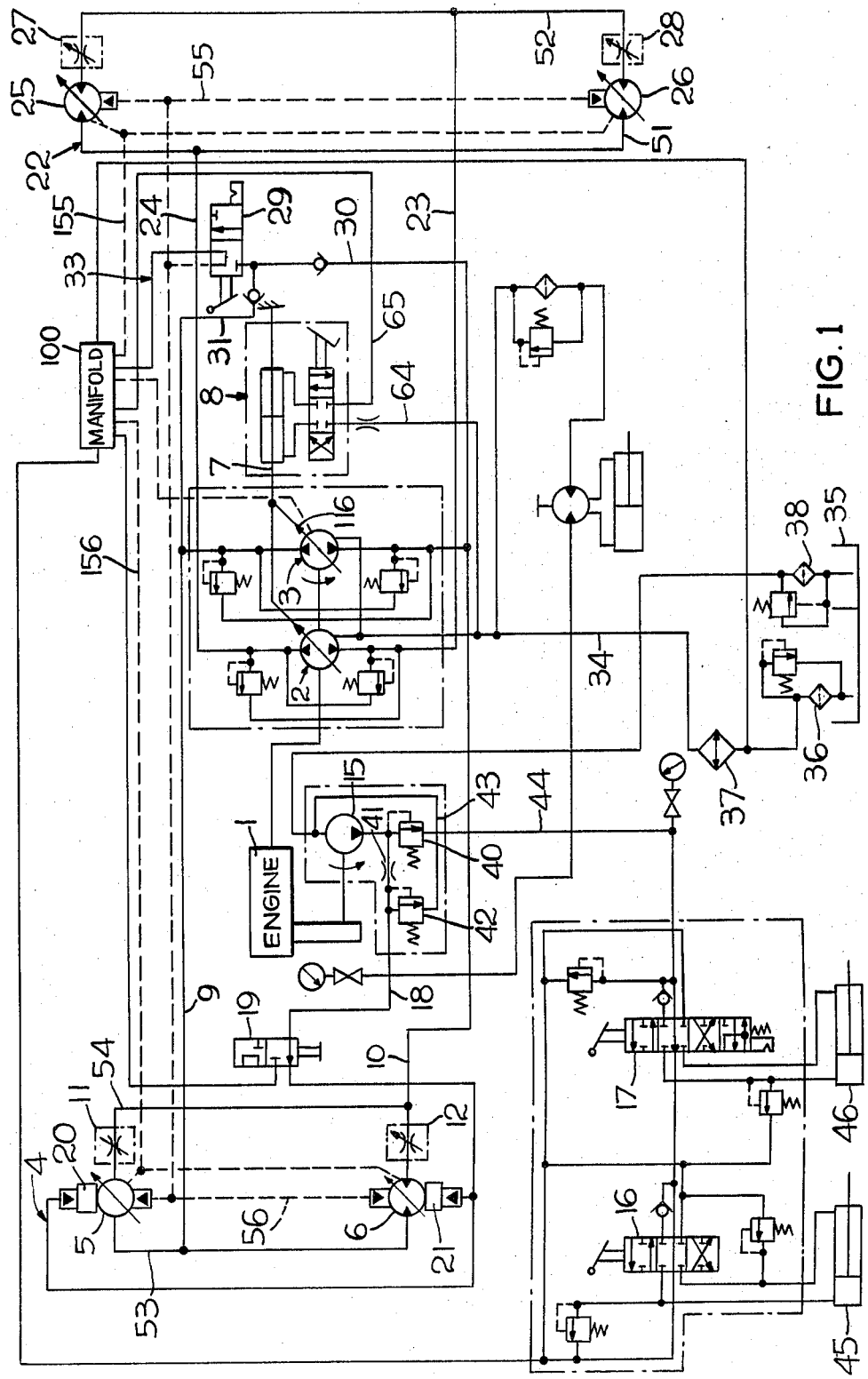
FIG. 1 illustrates a schematic diagram of the hydrostatic system.

Referring to the drawings, FIG. 1 illustrates the schematic drawing of the hydrostatic drive system. The internal combustion engine 1 drives the variable displacement pumps 2 and 3. Both of the pumps are driven in tandem and driven by the engine 1. The hydrostatic drive pump 3 is the rear drive pump in the rear closed hydrostatic loop 4 which includes the rear drive wheel motors 5 and 6. The hydrostatic pump 3 is a variable displacement pump with a camming mechanism 116 controlled by the control arm 7 from the hydraulic servovalve 8. The rear hydrostatic variable displacement hydrostatic pump 3 is reversible, which is controlled by the hydraulic servovalve 8. Pressurized fluid is supplied to the rear dual displacement wheel motors selectively through conduits 9 and 10. The limit valves 11 and 12 limit the flow through the dual displacement rear drive motors 5 and 6 to prevent wheel spin out of one wheel by assuring that adequate flow will be supplied to each of the two motors.

An auxiliary pump 15 is also driven by the internal combustion engine 1 and supplies pressurized fluid for the implement control valves 16 and 17. The auxiliary pump 15 also supplies pressurized fluid through the conduit 18 to the hydraulic brake valve 19 which controls the brakes 20 and 21 on the rear wheels of the vehicle. The rear brake is selectively actuated and is provided with a safety start switch to assure that the brake is on when the vehicle is started.

The front closed loop system circuit 22 includes the front variable displacement pump 2 which supplies pressurized fluid selectively through the conduits 23 and 24. The front dual displacement motors 25 and 26 are reversible and are selectively driven in either direction in response to the forward and reverse selected drive from the hydraulic servocontrol valve 8 controlling pump 2. The flow control limit valves 27 and 28 are provided with each of the dual displacement front wheel motors 25 and 26 to assure that each of the wheels is driving to avoid spin out of any one wheel due to lack of traction for that particular wheel.

The hydraulic selector valve 29 is manually controlled and receives pressurized fluid from conduits 30 and 31 to selectively position the valve to operate the hydrostatic motors for the front closed loop and the rear closed loop in the selected dual speed ranges. Pressurized fluid is allowed to pass through front wheel control circuit 33 to operate the motors in the selected speed range. Pressurized fluid is received from the hydrostatic variable displacement pumps 2 and 3 and from conduits 30 and 31. Operation of the hydraulic servocontrol valve 8 and the hydraulic selector valve 29 will be described subsequently.

The variable displacement pumps 2 and 3 receive hydraulic fluid from the conduit 34 and reservoir 35. The filters 36 and 37 filter the fluid before it passes through the conduit 34 to the variable displacement pumps 2 and 3. A filter 38 filters fluid as it passes from the reservoir 35 to the auxiliary pump 15. Auxiliary pump 15 pressurizes fluid which is supplied to the brake valve 19 through a priority control valve arrangement including the pressurizing valve 40 and orifice 41, which directs fluid to the brake. The relief valve 42 and conduit 43 bypass fluid if there is excessive pressure on the conduit 18.

Auxiliary pump 15 supplies pressurized fluid in the conduit 44 which is connected through the implement valves 16 and 17 to the rams 45 and 46 which may be used for front end loaders or back hoes or any suitable implement operation desired.

Figure 2:
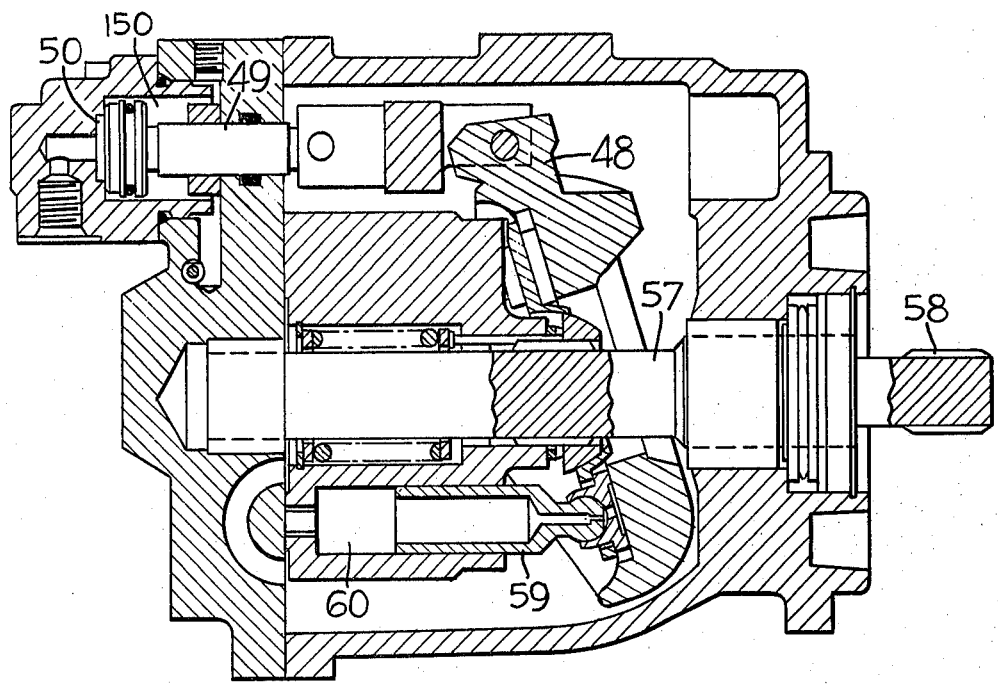
FIG. 2 illustrates a cross-section view of the two speed range dual displacement hydrostatic motor.

Referring to FIG. 2 the two speed dual displacement wheel motor is shown. The motor is a piston type having a swash plate 48 pivoted to vary the displacement of the motor. The swash plate is moved by the plunger 49 in response to pressure in the pressurizing chamber 50 and 150. The control for the motor 5 is connected through the pilot line 55 and 56 which are connected through the selector hydraulic valve 29. Pressurized fluid from the conduits 55 or 56 are received in a pressurizing chamber 50 to bias the swash plate 48 to a selected position for fluid displacement of the pump. When pressurized fluid from the valve is interrupted, the manifold pressure is applied to chamber 150 to provide the second speed range for the motor for a second motor displacement. This control provides a hydraulic means to vary the position of the swash plate to vary the torque and speed of the wheel motors.

The drive axle 57 is provided with a spline connection 58 adapted for receiving a wheel for driving of the vehicle. The pistons 59 selectively drive the shaft 58 as pressurized fluid is supplied to the chamber 60 of the motors from the pump. A plurality of pistons 59 are provided in the motor for powering the drive of the vehicle.

Figure 3:
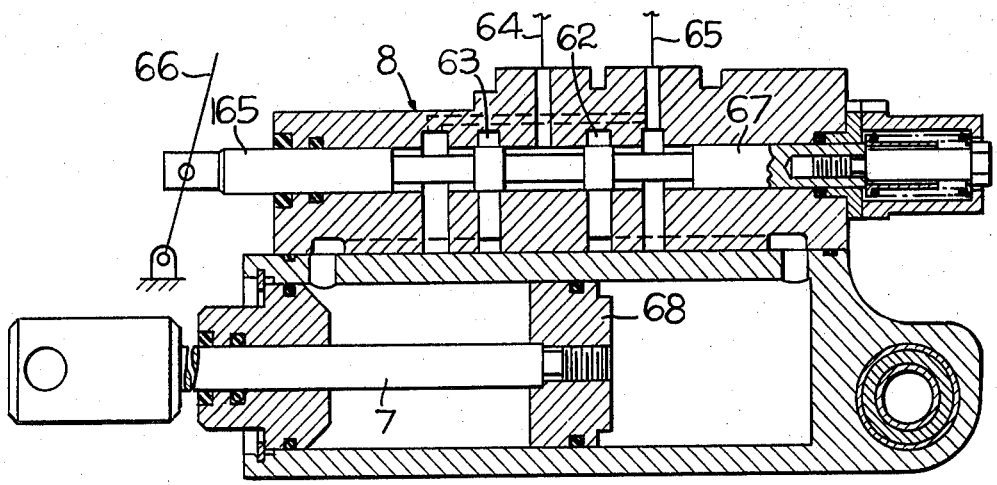
FIG. 3 illustrates the cross-section view of the hydraulic servocontrol valve for hydraulically controlling the camming of the variable displacement pumps.

FIG. 3 illustrates the hydraulic servovalve 8. The hydraulic servovalve is provided with connections to the passages 62 and 63 for connection to conduits 64 and 65 in the hydraulic system. Conduit 65 is connected to the manifold 100. Conduit 64 receives pressurized fluid for charging the circuit for the pumps 2 and 3.

When the control end 165 is operated by the control lever 66 to reciprocate the valve spool 67, moving the valve spool 67 in the right-hand direction pressurizes fluid to bias the piston 68 in the right-hand direction which in turn carries the camming rod 7 to control camming of the cam mechanism in the variable displacement pumps 2 and 3. Moving the lever 66 and spool 67 in the opposite direction releases pressurized fluid and allows discharge of fluid from the piston 68 and return movement of the control rod 7 and the camming mechanism in the pumps 2 and 3 in the opposite direction. The operation of the hydrostatic drive system will be described in the following paragraphs.

The tandem variable displacement pumps 2 and 3 are driven by the internal combustion engine 1. The variable displacement pumps 2 and 3 are controlled through the hydraulic servovalve 8. When the engine 1 is running, fluid is sufficiently pressurized to operate the piston 68 in the servovalve 8 reciprocating the control rod 7. The control rod 7 operates the camming mechanism in the variable displacement pumps 2 and 3. Infinite variable displacement is provided by the servovalve 8. The servovalve 8 can also reverse the operation of the pumps 2 and 3 and thereby reverse the transmission drive for the vehicle. Pressurized fluid from the variable displacement pumps 2 and 3 circulate in the closed loop 4 and the front closed loop 22 and through the motors 20, 21 and 25, 26. The motors are also controlled by the hydraulic valve 29. The hydraulic selector valve 29 receives pressurized fluid from the pump 3 which is supplied through the pilot lines 55 and 56 to the motors to selectively control the displacement of the motors. When the selector valve 29 is in the low displacement range, the motors generate high torque.

Accordingly, the control system for the drive of the vehicle is controlled hydraulically to vary the torque and speed and provide a dual range for driving the motors with drive on all four wheels.

The auxiliary pump 15 is also driven by the engine 1 and provides pressurized fluid for operating the implements through the control valves 16 and 17. Priority flow is provided by the valve 41 which maintains a constant flow rate to the steering circuit. Relief valve 42 relieves excess pressure in the steering circuit. The brake 19 obtains release pressure from this priority circuit and also has a provision whereby the brake must be in the operating position in order to start the vehicle. This provides a safety feature for the starting of the vehicle.

The drive system of the wheel motors is provided with flow control limiting valves 11, 12, 27 and 28. The flow control limiting valves limit the flow through any one of the motors to assure that the other motor will not spin the wheel with complete loss of drive because of the spin out on the one wheel. Restrictive flow during normal operation does not limit the power transmitted to the wheel, but only controls the flow by limiting a maximum flow to any one motor to assure that each of the motors will be continuously driving the vehicle.

The embodiments of the invention in which an exclusive property or privilege is claimed are defined as follows:

1. A hydrostatic vehicle drive system comprising, a hydrostatic drive circuit including a front variable displacement pump, dual displacement front wheel motors, a flow limiting valve limiting the flow to each of said front wheel motors to assure drive on both front wheel motors, a rear hydrostatic drive circuit including a rear variable displacement pump, dual displacement rear wheel motors, a flow limiting valve limiting the flow to each of said rear wheel motors to assure drive on both rear wheel motors, a common drive for simultaneously driving said pumps, a hydraulic servocontrol valve controlling the displacement of the variable displacement pumps, a reservoir supplying hydraulic fluid to the said variable displacement pumps, a hydraulic selector valve for selectively selecting the displacement of said front and rear wheel motors, a return flow circuit for said pumps providing a source of pressurizing fluid for said servocontrol valve and said selector valve, said hydraulic servocontrol valve and said hydraulic selector valve connected to said return flow circuit for selectively controlling displacement of said variable displacement pumps and displacement of said motors to provide four wheel drive in two speed ranges and infinite speed over each range of the drive system.

2. A hydrostatic vehicle drive system as set forth in claim 1 including an auxiliary circuit for operating an implement including an auxiliary pump, control valves and operating rams for operating said implements.

3. A hydrostatic vehicle drive system as set forth in claim 1 wherein said motors define reversible motors, and means in said hydraulic servovalve for controlling the forward and reverse operation of said variable displacement pumps.

4. A hydrostatic vehicle drive system as set forth in claim 1 including an engine for driving said pumps.

5. A hydrostatic vehicle drive system as set forth in claim 1 wherein said flow limiting valves in said front wheel closed loop and said rear wheel closed loop for limiting the flow to each of said motors includes a variable control.

6. A hydrostatic vehicle drive system as set forth in claim 1 including a brake system comprising a brake control valve connected to a source of pressurized fluid, braking means on at least two of the wheel driving motors for braking said vehicle.

7. A hydrostatic vehicle drive system as set forth in claim 1 wherein said pumps comprise tandem driving means from a common drive, a camming means connected to said hydraulic servovalve for camming both of said variable displaced pumps simultaneously.

8. A hydrostatic vehicle drive system as set forth in claim 1 wherein said hydraulic selector valve defines two positions for selectively operating said motors in two speed ranges.

9. A hydrostatic vehicle drive system as set forth in claim 1 wherein said hydraulic servocontrol valve includes a three position valve, a piston biased hydraulically to control displacement of said pumps responsive to said three position valve.

10. A hydrostatic vehicle drive system as set forth in claim 1 wherein said valves include manual means to selectively apply pressurized fluid to control displacement of said pumps and motors.

* * * * *